United States Patent [19]

Komarek

[11] 4,306,846

[45] Dec. 22, 1981

[54] BRIQUETTING ROLL AND MOLD SEGMENT THEREFOR

[75] Inventor: Karl R. Komarek, Chicago, Ill.

[73] Assignee: K. R. Komarek Inc., Elk Grove Village, Ill.

[21] Appl. No.: 172,390

[22] Filed: Jul. 25, 1980

[51] Int. Cl.³ .................................................. B29C 3/02

[52] U.S. Cl. ...................................... 425/78; 425/237; 425/471

[58] Field of Search .................. 425/78, 237, 470, 471

[56] References Cited

U.S. PATENT DOCUMENTS

| | | | |
|---|---|---|---|
| 538,475 | 4/1895 | Albrecht | 425/107 |
| 915,332 | 3/1909 | Burnes | 425/195 |
| 1,232,764 | 6/1921 | Brundage | 425/1 |
| 2,294,098 | 8/1942 | Stromer | 83/12 |
| 2,945,259 | 7/1960 | Decker et al. | 18/21 |
| 2,958,902 | 11/1960 | Decker et al. | 18/21 |
| 2,958,903 | 11/1960 | Decker | 18/21 |
| 3,077,634 | 2/1963 | Komarek et al. | 18/21 |
| 3,829,267 | 8/1974 | Woodward | 425/237 |
| 3,830,612 | 8/1974 | Komarek | 425/194 |
| 3,883,282 | 5/1975 | Armbrust et al. | 425/237 |
| 3,907,485 | 9/1975 | Komarek | 425/470 |
| 3,907,486 | 9/1975 | Kennedy | 425/471 |
| 3,969,062 | 7/1976 | Komarek | 425/471 |
| 3,981,477 | 9/1976 | Armbrust et al. | 425/237 X |
| 4,097,215 | 6/1978 | Komarek | 425/237 X |

*Primary Examiner*—J. Howard Flint, Jr.
*Attorney, Agent, or Firm*—Finnegan, Henderson, Farabow, Garrett & Dunner

[57] ABSTRACT

A briquetting roll press is disclosed which includes a number of replaceable mold segments. The mold segments are designed to transmit the radial compression forces applied to the mold segments to the central member of the briquetting roll through the sidewalls of the mold segments.

17 Claims, 13 Drawing Figures

BRIQUETTING ROLL AND MOLD SEGMENT THEREFOR

FIELD OF THE INVENTION

The present invention relates to briquetting rolls comprised of a cylindrical central member to which a plurality of replaceable mold segments are affixed. The present invention also relates to the mold segments for use in such briquetting rolls.

BACKGROUND OF THE INVENTION

The briquetting of particulate materials has been carried out for many years. Typically, materials such as charcoal were compacted by briquetting apparatus at relatively low pressures and temperatures. In recent years, briquetting techniques have been applied to compact other materials such as particulate metals and ceramic materials. Briquetting of such materials requires the use of high temperatures and pressures.

The use of high pressures between the briquetting rolls, the maintenance of high pressures at elevated temperatures as well as the abrasive nature of many of the materials compacted to form briquets results in a serious wear problem. Because of the nature of the wear problem, briquetting apparatus normally includes rolls having replaceable mold segments. Briquetting rolls having replaceable mold segments, have by their economies of operation, received substantial commercial acceptance for the compaction of particulate materials at high temperatures and pressures. Such economies, however, depend in part upon the frequency of replacement of the mold segments.

The materials used for the construction of the mold segments must exhibit very high strengths due to their exposure to high temperature and pressure. Because of the nature of the materials used for construction of the mold segments, when they have sufficient strength they are also quite brittle and incapable of tolerating significant distortion before they fracture.

It is one object of the present invention to provide a configuration for the mold segment, and the cavity within which the mold segment is affixed to the cylindrical roll, that reduces the bending and tension forces on the mold segments. The mold segments formed of these strong but brittle materials exhibit significantly longer useful lives by the elimination of such forces.

In addition to minimizing such forces on the mold segments, the configuration of the mold segments and the cylindrical member comprising the briquetting roll also must conform to the requirements of commercially viable briquetting rolls. The segments must be readily replaceable, relatively easy to manufacture without reliance on extremely close tolerances to effect the desired structure of the briquetting roll.

A number of briquetting roll structures incorporating replaceable mold segments are known in the art. For various reasons, none of these mold segments or briquetting rolls are completely satisfactory for use with briquetting operations using strong, but brittle materials for the mold segments.

One such type of briquetting roll assembly having replaceable mold segments is depicted in U.S. Pat. No. 3,907,485. The briquetting roll disclosed in this patent comprises a cylindrical central member adapted to receive a plurality of mold segments in its periphery. The mold segments are affixed to the cylindrical central member by fasteners engaging projections extending outwardly from the sidewalls of the mold segment. The configuration of the mold segment in its cooperation with the central member are such that radial compression forces applied to the mold segment are transmitted through the bottom surface of the mold segment which are coplanar with the projections from the sidewalls. The application of such forces to the mold segments produces bending stresses in the mold segment that can result in premature failure due to cracking of the strong, but brittle mold segment.

U.S. Pat. No. 3,077,634 discloses a type of briquetting roll structure with replaceable mold segments wherein the radial pressure applied to the mold segment is transmitted to the cylindrical central member through bottom surface of the mold segment. While the configuration of the mold segment would appear to reduce the bending stresses applied to the mold segment, the means of affixing the mold segment to the central member has several disadvantages. To obtain rigid clamping of the mold segments onto the cylindrical central member, each of the segments must be precisely machined so that they are the same length. If one mold segment is longer than another, it prevents the retaining rings that engage the sidewalls of the mold segments from being drawn tightly about all of the mold segments. This results in a lack of lateral restraint for other mold segments during the briquetting operation. The movement of the mold segments during the briquetting operation damages the cylindrical central member as well as causing damage to the mold segments themselves.

U.S. Pat. No. 3,690,062 discloses a segmented briquetting roll wherein the radial stress applied to the mold segment is transmitted to the cylindrical control member through the angularly disposed lower surface of the mold segments. The means of affixing the mold segments to the central member includes segment configurations that can cause localized bending at high stresses leading to the possibility of premature mold segment failure at the affixing means.

The briquetting roll structure of the present invention with the novel mold segment provides a detachable mold segment that can be readily manufactured, easily replaced in a briquetting roll structure. Furthermore, such a mold segment is not susceptible to breakage due to localized stresses or bending of the mold segment when it is subjected to the high pressures developed in modern briquetting operations.

The primary object of the present invention is to provide a readily manufactured, replaceable mold segment useful in briquetting operations having an enhanced service life due to the radial pressures of the briquetting operation being applied to the central member by the mold segments substantially through the sidewalls of the mold segments.

Other objects of the invention will be apparent from the following detailed description of the preferred embodiments or can be learned through practice of the invention as it is disclosed.

SUMMARY OF THE INVENTION

The present invention is a mold segment for a briquetting roll and a briquetting roll using such a mold segment.

The mold segment of the present invention includes an arcuate top working surface. Preferably, the top working surface is formed of a hard, wear-resistant material with the surface being a segment of a cylinder which is coaxial with the briquetting roll. The mold segment also includes two opposite endwalls. Preferably, the endwalls are substantially flat, and angularly disposed one from another at an angle that converges on the axis of rotation of the briquetting roll. Opposite sidewalls of the mold segment are disposed to transmit substantially all of the radial pressure applied to the mold segment to the briquetting roll through the conical sidewalls. Preferably, the sidewalls each have upper and lower portions with the lower sidewall portions being conical and divergent with respect to the axis of the rotation of the briquetting roll. It is also preferred that the conical angle of the sidewalls be such that radial pressure applied to the mold segment places the mold segment substantially in compression.

A preferred briquetting roll utilizing the mold segment of the present invention includes a cylindrical central member having a generally arcuate outer surface and a plurality of substantially conical cavities. A plurality of detachable mold segments are disposed to fit within the conical cavities in the cylindrical central member.

The detachable mold segments have an arcuate top working surface which is preferably a hard wear-resistant material disposed to form the particulate matter into briquets by operation of the briquetting roll. The surface of the mold segment is a segment of a cylinder with the cylinder being coaxial with the briquetting roll. The endwalls of the mold segment are substantially flat, angularly disposed one from the other and preferably convergent on the axis of rotation of the briquetting roll. The sidewalls of the mold segment connect the upper working surface and the endwalls. The sidewalls are conical and divergent with respect to the axis of rotation of the briquetting roll. The conical angle of the sidewall is substantially equal to the conical angle of the cavities within the cylindrical central member. Preferably, each of the sidewalls is comprised of an upper and lower sidewall portion with the lower portion of the sidewall being conical. When the mold segments are fitted within the conical cavities in the central member, substantially all the radial pressure applied to the mold segment is transmitted to the central member through the sidewalls of the mold segment, preferably through the lower portion.

The briquetting roll further includes means for engaging the the mold segment to affix the mold segment within the cavities in the cylindrical central member. Preferably, the upper portion of the sidewalls are used to affix the mold segment to the central member. In a preferred embodiment, the mold segment would include a bottom surface opposite the upper working surface of the mold segment. In such an embodiment, the bottom surface is spacially separate from the bottom of the cavities in the cylindrical central member when the mold segment is in place within the cylindrical member.

DESCRIPTION OF THE PREFERRED EMBODIMENT

Figure 2:
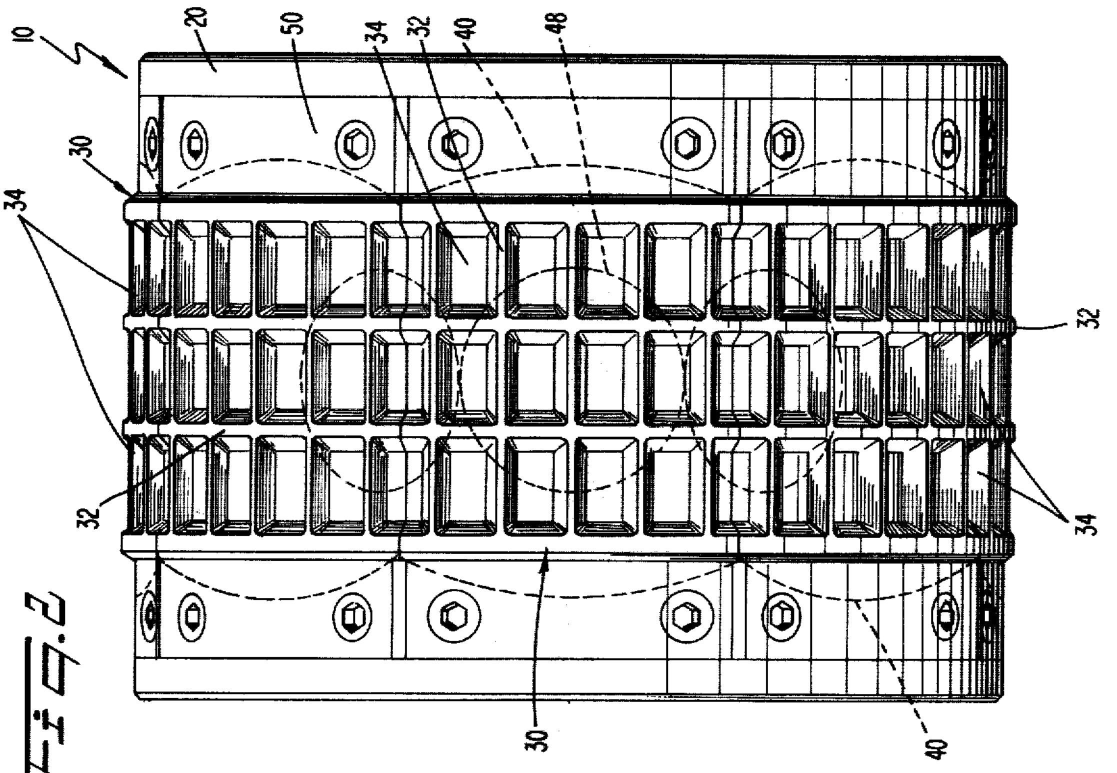
FIG. 2 is an end view of the structure depicted in FIG. 1 showing the peripheral surface of the mold segments and central cylindrical member.
Figure 1:
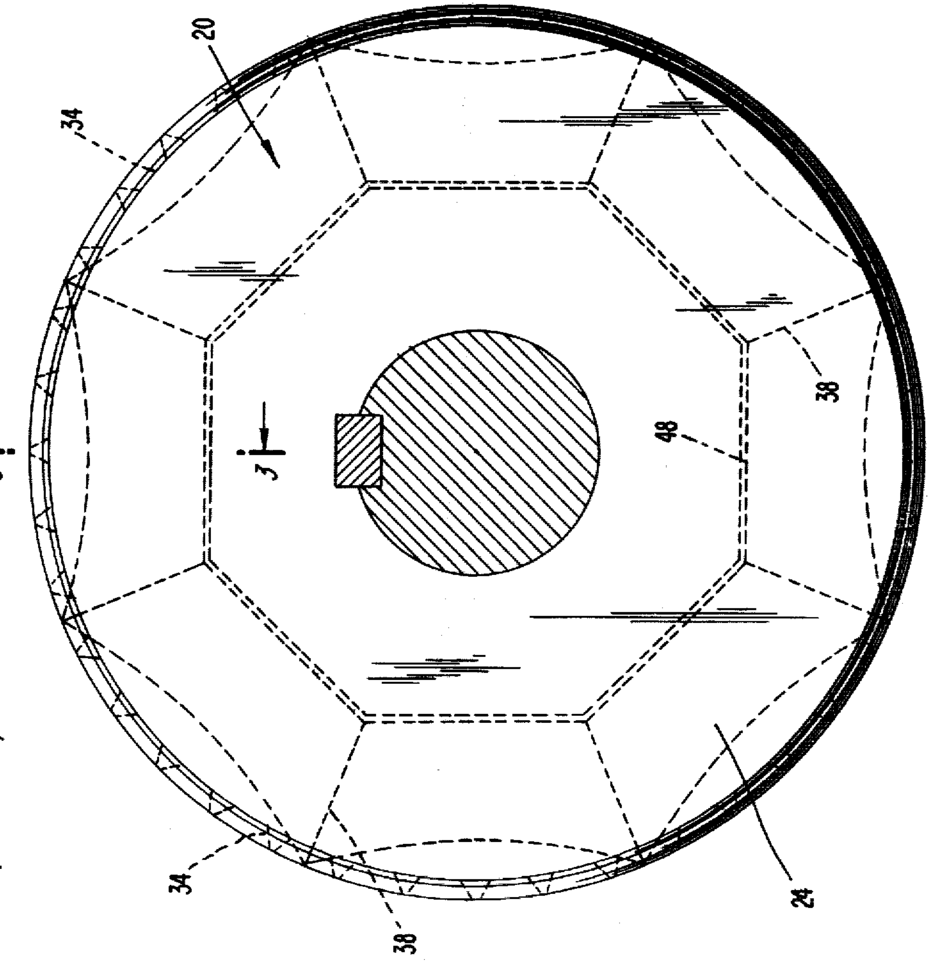
FIG. 1 is a side view of a briquetting press roll structure according to one embodiment of the present invention showing the relationship of the mold segments to the cylindrical central member.

Reference will now be made in detail to the present preferred embodiment of the invention and an example of which is illustrated in the accompanying drawings. A preferred embodiment of the briquetting roll 10 is shown in FIGS. 1 and 2.

Figure 3:
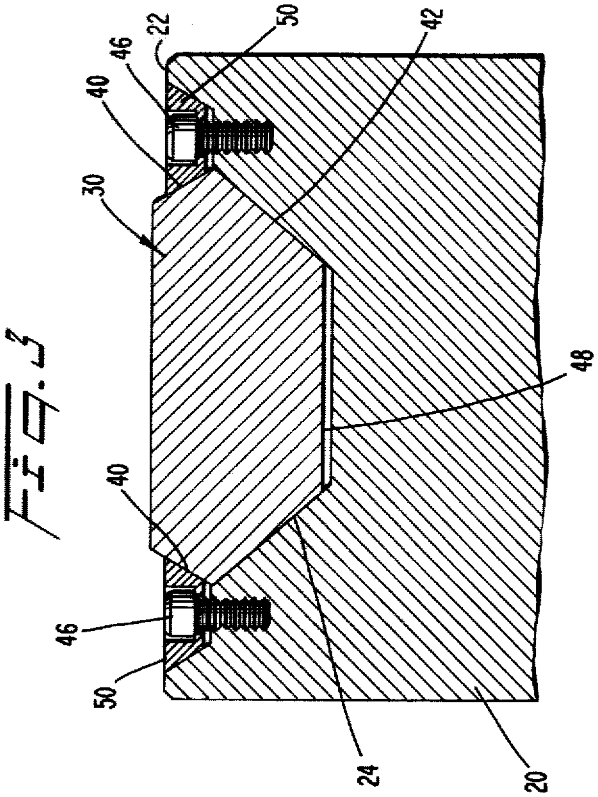
FIG. 3 is a partial cross-section of the embodiment of FIG. 1.

In accordance with the invention, the briquetting roll comprises a cylindrical central member having a generally arcuate outer surface. In this embodiment the surface of the central member includes a plurality of substantially conical cavities therein. As here embodied and most clearly depicted in FIGS. 1-3, the cylindrical central member 20 includes an arcuate outer peripheral surface 22 and a plurality of substantially conical cavities 24 that are disposed to receive detachable mold segments 30.

Figure 4:
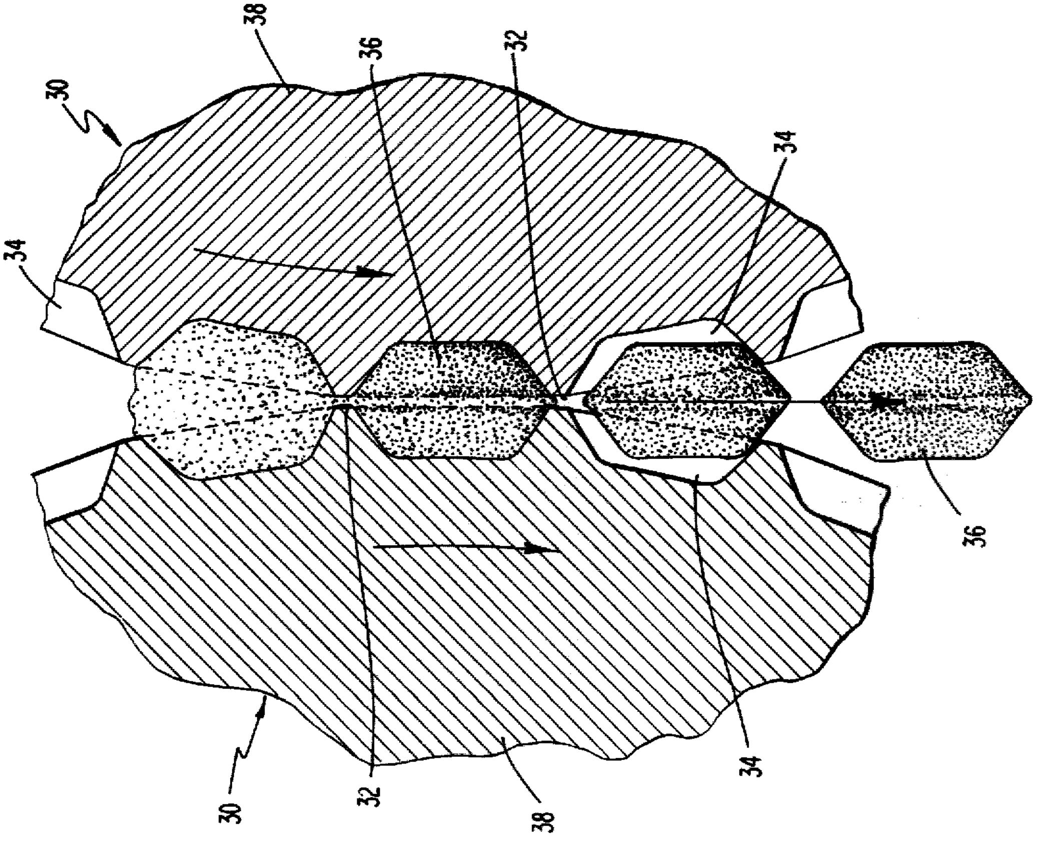
FIG. 4 is a partial cross-section of an embodiment of the invention showing the interaction of two mold segments of opposing briquetting roll structures.
Figure 5:
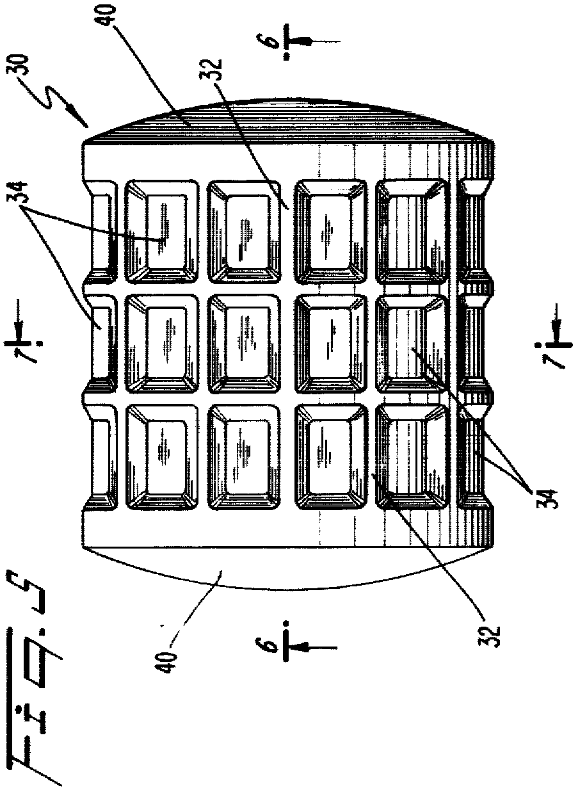
FIG. 5 is a top view of a mold segment showing one embodiment of a top working surface of such a segment.
Figure 10:
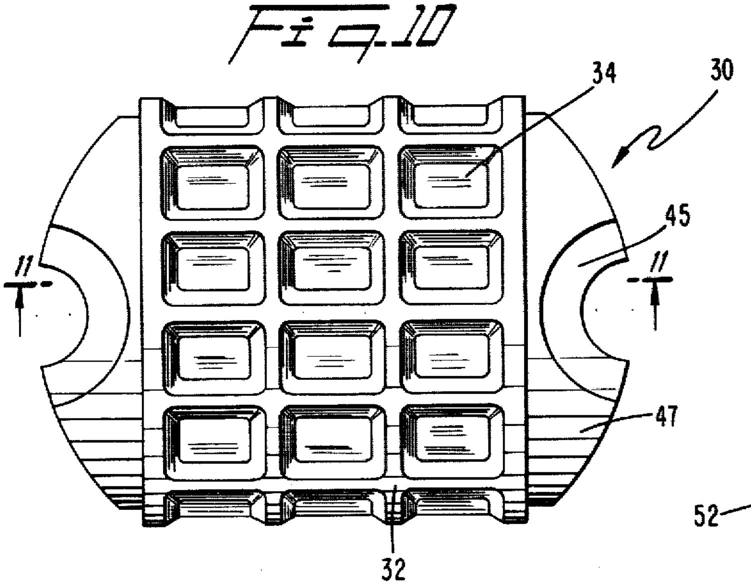
FIG. 10 is a top view of another embodiment of a mold segment.
Figure 11:
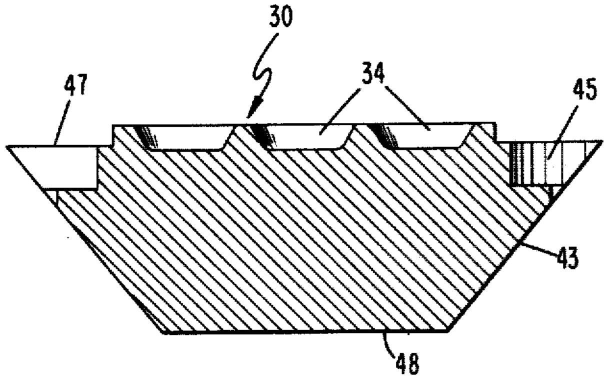
FIG. 11 is a cross-section of the embodiment of FIG. 10 illustrating the conical sidewalls of this embodiment.
Figure 13:
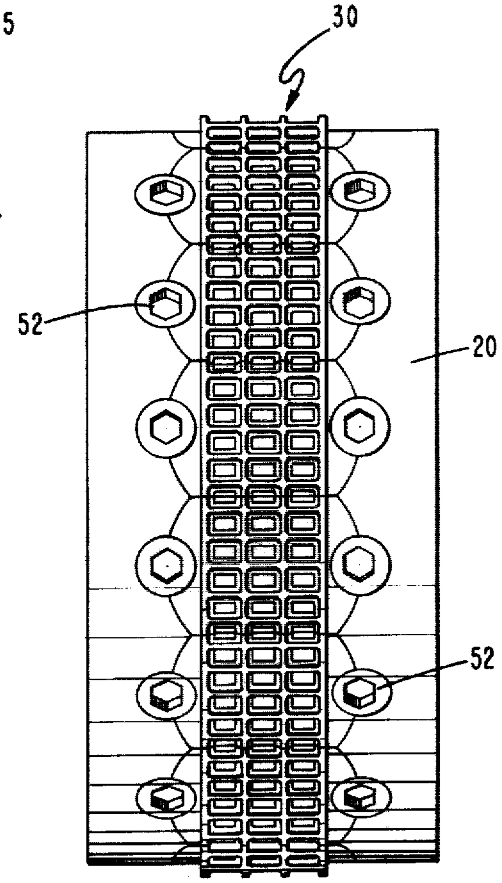
FIG. 13 is an end view of the embodiment of FIG. 5 showing the mold segments mounted in a central cylindrical member.

In accordance with the invention, each of the mold segments has an arcuate top working surface. As here embodied, and most clearly depicted in FIGS. 2, 5 and 10, the arcuate surface 32 of the mold segment 30 includes a plurality of mold cavities 34. As depicted in FIG. 4, the shape of the mold cavities 34 defines the shape of the briquets 36 that are formed by the briquetting roll. As is most clearly depicted in FIG. 1, the arcuate surface 32 of the mold segments 30 are segments of a cylinder which is coaxial with the briquetting roll 10.

Figure 7:
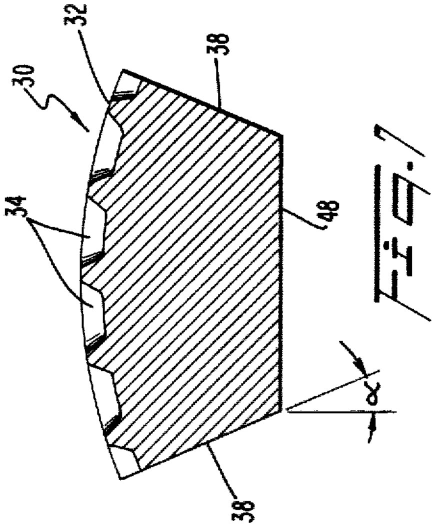
FIG. 7 is a cross-section of FIG. 5 showing the angular relation of the endwalls of such an embodiment.
Figure 12:
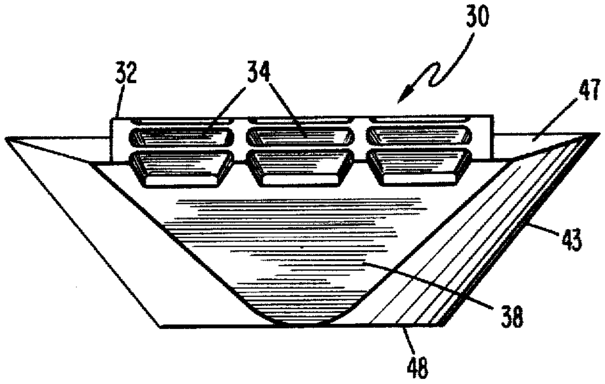
FIG. 12 is an end view of the embodiment depicted in FIG. 5 showing the interrelationship of the top working surface, the end walls and the sidewalls.

In accordance with the invention, the mold segment for the briquetting roll includes two opposite endwalls. As here embodied and most clearly depicted in FIGS. 1, 7 and 12, the endwalls 38 are substantially flat. As shown in FIG. 1, the flat endwalls of the adjacent mold segments abut one another where individual mold segments are in an abutting relationship. The angle by which one endwall of an individual mold segment is disposed from the other is determined by the number of mold segments to be included in the central member. In the embodiment depicted, the briquetting roll includes eight individual mold segments whose endwalls are disposed at an angle convergent on the axis of rotation of the roll equal to 45°. Each endwall 38 is inclined from the perpendicular one-half of the total angle of the endwalls. The embodiment depicted in FIG. 7 has each endwall 38 disposed at an angle (α) from the perpendicular and in this embodiment α equals 22½.

In accordance with the invention, the mold segments for the briquetting roll include opposite sidewalls disposed to transmit substantially all the radial pressure applied to the mold segment to the roll through the sidewalls.

Figure 8:
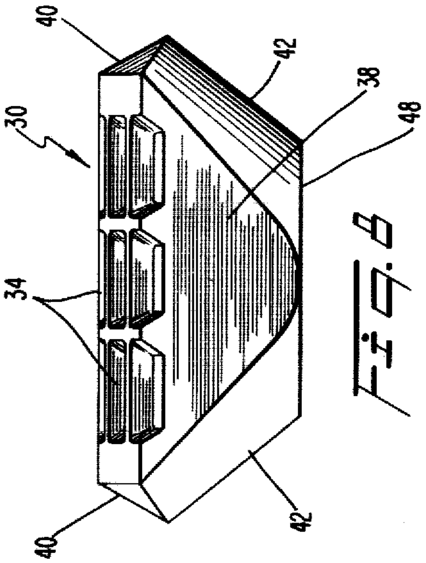
FIG. 8 is an end view of the embodiment depicted in FIG. 5 showing the interrelationship of the top working surface, the endwalls and the sidewalls.
Figure 6:
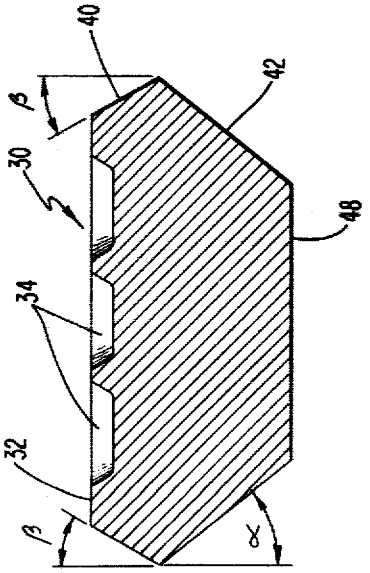
FIG. 6 is a cross-section of the embodiment of FIG. 5 illustrating the upper and lower portions of the sidewalls.

As embodied in FIGS. 1-9, the sidewalls of the mold segment 30 have an upper portion 40 and a lower portion 42 as is most clearly depicted in FIGS. 6 and 8. The function of the upper portion 40 is to interface with retaining means depicted in FIGS. 2 and 3 as retainers 50. The upper surface 40 preferably is substantially flat and, as is depicted in FIGS. 6 and 8, disposed at an angle convergent with respect to the upper working surface 32. This upper portion may also be conical. The retaining means 50 bear on the upper portion of the sidewall 40 forcing the mold segment substantially radially into the cavity 24 within the central member 20. The angle of the upper portion 40 is such that it also imparts an axial component of force to the mold segment to provide lateral restraint to the mold segment. As is most clearly depicted in FIG. 3, the upper portion 40 of the mold segment 30 is preferably flat and disposed at an angle converging with respect to the top working surface 32 of the mold segment 30. Preferably, the portions of the upper sidewalls are at an angle of from 60° to 120° of one another (30° to 60° from the vertical as depicted as β in FIG. 6).

In accordance with the invention, the sidewalls are disposed to transmit substantially all of the radial pressure applied to the mold segment to the roll through the sidewalls.

Figure 9:
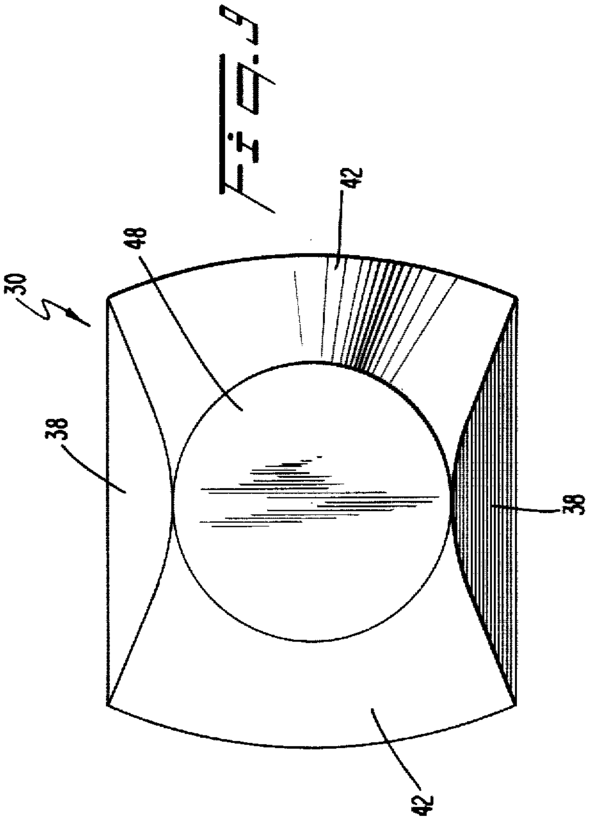
FIG. 9 is a bottom view of the embodiment of FIG. 5 showing the interrelationship of the sidewalls, endwalls and bottom surface of such an embodiment.

As here embodied and depicted in FIGS. 6, 8 and 9, the mold segment includes upper and lower portions with the lower sidewall portions 42 being generally conical and divergent with respect to the axis of rotation of the roll 20. The conical portions of the lower sidewall portions 42 of this embodiment are, more precisely, a conical frustum truncated by the endwalls 38, the bottom surface 48 and the upper sidewall portions 40. As is most clearly depicted in FIG. 3, the central member 20 includes a plurality of substantially conical cavities 24 and preferably the conical angle of the lower sidewall portions 42 is substantially equal to the conical angle of the conical cavities 24 in the central member 20. In such a configuration the mold segments 30 are disposed to fit within the conical cavities 24 such that substantially all the radial pressure applied to the mold segment is transmitted to the central member 20 through the lower sidewall portions 42 of the mold segment 30. Preferably, the conical angle between the opposite lower portions 42 of the lower sidewalls is in a range from 60° to 90°. Most preferably, the conical angle is about 80°. As depicted in FIG. 6, one-half of the conical angle is shown as γ.

In the embodiment of FIGS. 9-13 the sidewall of the mold segment is entirely conical without the upper portion 40 and the lower portion 42 depicted in the embodiment of FIGS. 1-8. As here embodied and most clearly depicted in FIG. 11 the mold segment 30 also contains provision for fastening the mold segment to the cylindrical member 20. In this embodiment fasteners 52 bear directly on cut-out portions 45 on portions 47 of the outer arcuate surface of the mold segment and thereby eliminate the need for the retaining members 50 utilized in the embodiment of FIGS. 1-8.

In such configurations, the application of radial pressure to the mold segments places the mold segment almost entirely in compression. The application of pressure to mold segments in a manner such that the mold segment is in compression significantly increases the service life of such mold segments. The embodiment depicted herein preferably includes space between the bottom surface 48 of the mold segment 30 and the central member 20. This is most clearly depicted in FIG. 3. The spatial separation of the bottom surface in the cavities 24 further insures that the radial pressure applied to the mold segments 30 results in compression of the mold segment rather than the generation of bending stresses. The width of the mold segment 30, the conical angle of the lower sidewall portions 42 or the sidewall 43, the strength of the material used to make the mold segment 30 and the spatial separation in the cavity separating the bottom surface 48 from the central member 20 all determine whether the mold segment is subjected to detrimental bending and tension forces. The range of conical angles disclosed above, used in combination with the high strength materials normally utilized for the manufacture of such mold segments, has proved to be advantageous and such mold segments have exhibited significant improvement in performance life.

It will be apparent to those skilled in the art that various modifications and variations in the briquetting roll press and the mold segments therefore can be made without departing from the scope of the invention disclosed. It is intended that the present invention cover modifications and variations of the disclosed inventions provided that they come within the scope of the appended claims and their equivalents.

What is claimed is:

1. A mold segment for a briquetting roll comprising:
an arcuate top working surface;
two opposite endwalls; and
opposite sidewalls being disposed to transmit substantially all of the radial pressure applied to said segment through said sidewalls to said roll said sidewalls including upper and lower portions, the upper portions of said sidewalls are disposed at an angle convergent with respect to said top working surface and said lower portions of said sidewalls are divergent with respect to the axis of rotation of said rolls.

2. The mold segment of claim 1 wherein said endwalls are substantially flat and disposed at an angle convergent on the axis of rotation of said roll.

3. The mold segment of claim 1 wherein said lower portions of said sidewalls are generally conical.

4. The mold segment of claim 3 wherein said lower portions of said sidewalls are in the form of a truncated section of a conical frustum.

5. The mold segment of claim 4 wherein the conical angle between opposite lower portions of said sidewalls is in the range of from 60 to 90 degrees.

6. The mold segment of claim 5 wherein said conical angle is about 80 degrees.

7. The mold segment of claim 5 wherein said conical angle is such that radial pressure applied to said mold segment places said mold segment substantially in compression.

8. The mold segment of claim 1 wherein said mold segment includes means for accommodating a fastener on the outer arcuate surface of said mold segment.

9. A briquetting roll comprising:

a cylindrical central member having a generally arcuate outer surface with a plurality of substantially conical cavities therein; a plurality of detachable mold segments comprised of:

an arcuate top working surface, said surface being a segment of a cylinder with said cylinder being coaxial with said roll; endwalls being substantially flat and angularly disposed one from the other; sidewalls connecting said upper working surface and said endwalls, each of said sidewalls being comprised of upper and lower sidewall portions, said lower sidewall portion being generally conical and divergent with respect to the axis of rotation of said roll, the conical angle of said lower sidewall portions being substantially equal to the conical angle of said conical cavities in said central member;

said mold segments being disposed to fit within said conical cavities in said central member such that substantially all of the radial pressure applied to said mold segment is transmitted to said central member through said lower sidewall portions; and means for engaging said upper sidewall portions to affix said mold segments within said cavities in said central member.

10. The briquetting roll of claim 9 wherein said sidewalls are in the form of a truncated section of a conical frustum.

11. The briquetting roll of claim 10 wherein the conical angle between opposite sidewalls is in the range of from 60 to 90 degrees.

12. The briquetting roll of claim 10 wherein said conical angle is about 80 degrees.

13. The briquetting roll of claim 9 wherein said endwalls are substantially flat and disposed at an angle convergent on the axis of rotation of said roll.

14. The briquetting roll of claim 13 wherein opposite upper portions of said sidewall are disposed at an angle convergent with respect to said top working surface.

15. The briquetting roll of claim 14 wherein said means for engaging said upper sidewall portions are detachably affixed to said roll and said sidewall engaging means includes a portion bearing on the upper portion of said sidewall.

16. The briquetting roll of claim 15 wherein said upper portions of said sidewall are flat and are disposed at an angle of from 60 to 120 degrees of one another.

17. The briquetting roll of claim 9 wherein said mold segment includes a bottom surface opposite said upper working surface, said bottom surface being spacially separate from the bottom of said cavities in said central member.

* * * * *